No. 628,586. Patented July 11, 1899.
J. C. LOOK.
AIR COUPLING HANGER.
(Application filed Jan. 18, 1899.)
(No Model.)
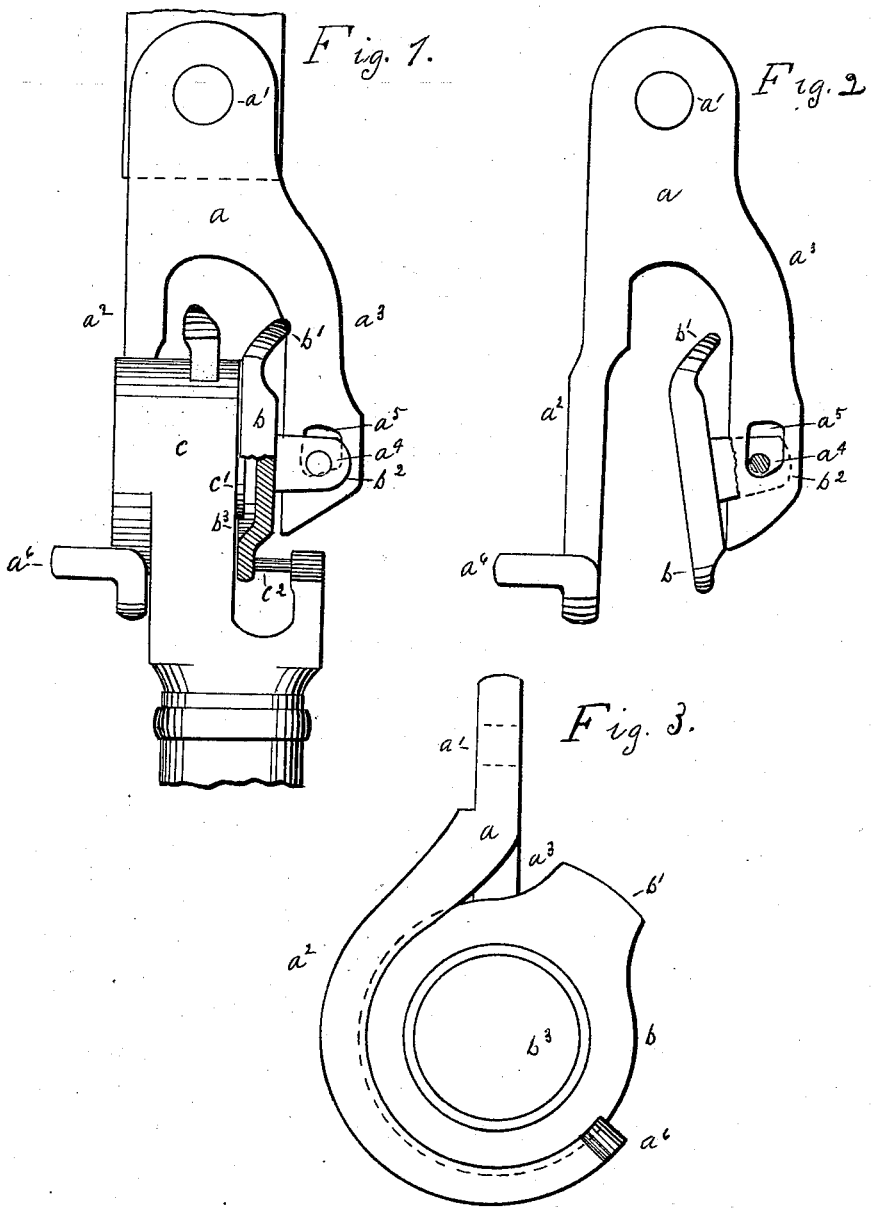
Witnesses
C. C. Hampton
J. M. Berry
Inventor.
John C. Look.

UNITED STATES PATENT OFFICE.

JOHN C. LOOK, OF TUDOR, CALIFORNIA.

AIR-COUPLING HANGER.

SPECIFICATION forming part of Letters Patent No. 628,586, dated July 11, 1899.

Application filed January 18, 1899. Serial No. 702,583. (No model.)

*To all whom it may concern:*

Be it known that I, JOHN C. LOOK, a citizen of the United States, residing at Tudor, county of Sutter, State of California, have invented a new and useful Improvement in Air-Coupling Hangers, of which the following is a specification.

The object of the improvement is to provide a hanger for the air-brake hose-coupling that will be more efficient in closing the airport of the coupling. This is accomplished by having a loosely-pivoted cap as a face for the coupling to rest against when in the hanger and also in having the cap cup-shaped to better protect the gasket.

The hanger for air-brake couplings, sometimes called the "dummy" coupling, now in use on railway-cars has a rigid face, against which the raised gasket of the coupling is pressed. This causes considerable wear on the gasket and more often on one side of the gasket than on the other. Also the face and hook have to be nicely adjusted to each other or the air-port is left open on one side, and a coupling with a new gasket is difficult to press in. All this difficulty may be overcome by my improvement, which I will more fully explain.

In the drawings, Figure 1 is a hanger with a coupling inserted. Fig. 2 is a front view of the hanger. Fig. 3 is a side view of the hanger.

$a$ is the hanger, having the hole $a'$ for attaching to the car.

$a^2$ is the hook in which the coupling is held.

$a^3$ is the arm to which the cap $b$ is attached.

The hook $a^2$ is similar to the one now in use. The cap $b$ is in the shape of a disk of a diameter sufficient to cover the face of the coupling with such extension $b'$ as is necessary to guide the coupling into place and is attached to the arm $a^3$ at $a^4$ by ears $b^2$ on the cap projecting on each side of the arm and bolted through. Requisite play is left between the ears and the arm and the cap and the arm, so that the cap may tilt in any direction. The hole $a^5$ in the arm is made much larger than the bolt, and the bottom of the hole is inclined, pointing downwardly toward the cap $b$ in order that the cap $b$ may gravitate toward the coupling $c$, as the couplings vary in size, some requiring more space than others, and also the cap must give way backward when the gasket $c'$ is pressed in by the rim of the cap and then come forward by its gravity down the incline and close on the face of the coupling in whatever position the coupling may be.

The cap $b$ may be a plain disk, as in Fig. 2, or cup-shaped, as shown partly in section at $b^3$ in Fig. 1. The cup shape is considered preferable, as the gasket rests free and the face of the coupling is entirely covered, preventing ice from forming on it.

The enlarged point $a^6$ on the hook $a^2$ serves as a guide in inserting the coupling and also for preventing the coupling from being hung on the point of the hook by the stud $c^2$ of the coupling, as is often done by mistake or carelessness and leaving the port open for the entering of dust.

Having described my invention, what I claim as new, and desire to secure by Letters Patent, is—

1. An air-coupling hanger having the cap for closing the port of the coupling pivoted laterally from the face of the coupling.

2. An air-coupling hanger having a hook, and a cap pivoted laterally therefrom for closing the port of the coupling, and means whereby the coupling and cap are brought together.

3. An air-coupling hanger having a hook and a loosely-connected cap laterally therefrom for closing the port of the coupling, and the said cap limited in its outward movement to such a point as is required for the retaining of the bowl of the coupling within the hook.

4. An air-coupling hanger having a hook and a loosely-connected cap laterally therefrom for closing the port of the coupling, and the said cap hung in an incline slide for the purpose of having it gravitate toward the port of the coupling and recede under pressure.

5. An air-coupling hanger having a hook, and a cap pivoted laterally therefrom for closing the port of the coupling, the said cap having a recess larger than the gasket of the coupling, and means whereby the said cap may recede or advance as the pressure against it is maintained or released.

6. An air-coupling hanger having a hook and a face for closing the port of the coupling, and the said hook sufficiently enlarged at the point to prevent the coupling from being hung on it by the stud $c^2$.

JOHN C. LOOK.

Witnesses:
C. C. HAMPTON,
J. M. BERRY.